United States Patent Office.

IMPROVED COMPOSITION FOR DESTROYING INSECTS ON TREES AND PLANTS.

JOSEPH A. ELIAS, OF LE ROY, OHIO.

Letters Patent No. 59,986, dated November 27, 1866.

SPECIFICATION.

TO ALL WHOM IT MAY CONCERN:

Be it known that I, JOSEPH A. ELIAS, of Le Roy, in the county of Lake, and State of Ohio, have invented certain new and useful Compositions for preventing lice, caterpillars, borers, and insects from destroying fruit trees, to be successively applied, and co-operating and acting as will be set forth; and I do hereby declare that the following is a full, clear, and exact description of the said compounds, the mode of applying and manner of operation.

It is well known to all persons having the care of fruit trees, that of late years in almost all sections of the country damage, more or less in extent, has ensued to the fruit and trees from the attacks of vermin. The object of my invention is to supply a composition of ingredients, in or about the proportions herein stated, that will be absorbed by the sap of the tree when it is ascending, so as to become infused therein, and permeate the limbs and branches thereof to the inner bark, thereby preventing lice, caterpillars, borers, and insects from lodging or breeding therein, or on or under the outer bark.

The ingredients I use are compounded in two forms, Nos. 1 and 2.

No. 1 consists of a strong decoction of tobacco in water, ten parts; solution of powdered gum aloes in whisky, one part.

No. 2 consists of common spirits of turpentine, one part; proof alcohol, thirty parts.

The proportion of turpentine to the alcohol may be varied, at the option of the user, so as to increase the proportion one part to twelve parts of the alcohol; but, as turpentine is of a very active nature, the proportion given in the above formula is the minimum quantity. As spirits of turpentine is a necessary ingredient in my method of treating fruit trees for keeping vermin therefrom, and being aware that its nature is such as to prevent its uniting with aqueous solutions, which, if so used, would be apt to float, and be therefore unequally distributed, I use it in the form set forth in No. 2, in which form the alcohol is used to hold the turpentine while being applied by the brush in quantity sufficiently small to answer the purpose intended; otherwise, the turpentine, if used alone, might be applied in quantity so large as to be detrimental to the life of the tree.

The method of applying the said compositions is as follows: At the season of the year when the sap ascends the tree, and selecting fine and dry weather for the purpose, and when the bark is perfectly dry, I apply, with a convenient swab or brush, the composition No. 1 around the lower part of the tree for the space of fifteen inches to two feet from the surface of the ground, and in sufficient quantity, to be regulated by the size of the tree. On the following day I apply to the same surface the composition No. 2. Should rain occur soon after, or before the sap has received the full benefit of the said application, (in the judgment of the user,) it may be well to repeat the process. It would greatly facilitate the penetration and aid the effect of the said applications, if a few longitudinal incisions or scorings with a sharp knife, or other instrument, be made on the said space of fifteen inches or two feet, through the bark, into and through the inner bark of the tree, as is often the practice with some when trees are "bark-bound." This scoring, however, is not essential; it is optional with the person using my process. The effect of these applications will be the penetration of the several ingredients into the circulating channels of the sap, so that it will absorb and carry up and diffuse into the limbs and branches of the tree the essential elements of the said ingredients, thence through the pores of the inner bark thereof to the outer bark. This treatment will prevent vermin from lodging or breeding in or under the outer bark or otherwise injuring the tree, and to destroy any ovary deposited previous to the said treatment.

Having thus fully described my invention, what I claim therein as new, and desire to secure by Letters Patent of the United States, is—

I claim the compositions Nos. 1 and 2, herein described, consisting of the several ingredients, in or about the proportions stated, and applied in the manner as herein specified and for the purposes set forth.

JOSEPH A. ELIAS.

Witnesses:
J. F. SINGLE,
M. S. HARVEY.